United States Patent [19]

Prugh et al.

[11] 4,206,314

[45] Jun. 3, 1980

[54] GRAPHIC DIGITIZER

[75] Inventors: Richard W. Prugh, Gaithersburg; Brownlow J. Fadden, Columbia, both of Md.

[73] Assignee: GTCO Corporation, Rockville, Md.

[21] Appl. No.: 933,569

[22] Filed: Aug. 14, 1978

[51] Int. Cl.² ............................................. G08C 21/00
[52] U.S. Cl. .................................................... 178/19
[58] Field of Search .................................. 178/19, 18

[56] References Cited

U.S. PATENT DOCUMENTS

| | | | |
|---|---|---|---|
| 4,018,989 | 4/1977 | Snyder et al. | 178/19 |
| 4,054,746 | 10/1977 | Kamm | 178/19 |
| 4,080,515 | 3/1978 | Anderson | 178/19 |
| 4,081,603 | 3/1978 | Davis et al. | 178/19 |
| 4,088,842 | 5/1978 | Ikedo | 178/19 |

*Primary Examiner*—Thomas A. Robinson
*Attorney, Agent, or Firm*—John E. Benoit

[57] ABSTRACT

An X-Y coordinate position locating or measuring digitizing device in which a cursor (inductor), moveable within an electromagnetic field generated by successively activated grid wires, develops a voltage from the field, and, in conjunction with conditioning circuits, yields the electrical intelligence required to indicate its position with a high degree of precision. Currents are successively passed through parallel grid lines for a given axis at discretely separate distances, the resultant successively generated field inducing a time variant voltage at the cursor coil output with amplitude and phase dependent upon the position of the cursor in relation to the actuated grid line. Conditioning circuitry to which the cursor coil output is coupled uniquely detects the phase reversal in the cursor coil output signal, interprets this reversal point in a manner which very accurately and linearly relates cursor position to time, and generates a "STOP" pulse indicating that the above phase reversal has been sensed. An enable signal initiated at an arbitrary reference point and terminated by the "STOP" pulse is then used to permit a precision clock to relate the distance of the cursor from this arbitrary point to the time needed to reach the cursor center from that reference point. Cursor position then becomes a function of precisely generated pulses accumulated in a counter.

9 Claims, 8 Drawing Figures

GRAPHIC DIGITIZER

This invention relates generally to the determination of the physical position of coordinate determination on a surface by employing a cursor embodying a coil with relation to a grid of parallel conductors and more specifically to determining the position of the cursor in a continuous linear fashion.

BACKGROUND OF THE INVENTION

Apparatus for translating the position of a writing instrument into electrical signals for transmission to a remote location such that the position, and corresponding movements, of the writing instrument may be recreated, are well known in the art. Thus, drawings, manuscripts, or the like, may be reproduced at remote locations. Among the more sophisticated prior art devices, are those in which movements of the writing instrument in the X and Y coordinates are sensed by electromagnetic means, or the like, and each sensed dimension is translated into a signal capable of transmission. X and Y coordinate positional information derived in the traditional manner may provide inputs to data processing apparatus such as computers, remote data terminals and special systems for processing coordinate data.

Some objections to some of the known art apparatus are limited resolving power, detrimental environmental effects, sensitivity to adjustment and instability and lack of accuracy to the degree which would be desirable. A number of other problems exist in these known systems including the need for a high density of grid wires for comparable performance and more complex circuits. As an example, most of these systems are both amplitude sensitive and phase sensitive, which places strict limitations on the inputs to the system. Another problem is that the spacing of the grid lines is extremely critical and very little variation is allowable. Accordingly, manufacture of the grid tablet is relatively expensive. A further problem relates to the criticality of a coil diameter and the necessity of the position of the sensor being substantially parallel to the grid. Yet another problem with the known sensors is the fact that the cursor cannot be removed and replaced during a single operation, but must be initiated from the start if it is so removed.

Accordingly, it is an object of this invention to provide apparatus whereby the position of the cursor can be determined in a continuous linear fashion by using accurate electrical interpolation techniques to determine position between grids.

It is a further object of this invention to provide apparatus wherein the rate of counting is variable, thus providing any resolution desired.

Another object of this invention is to provide an apparatus wherein the accuracy of the output is not wholly dependent upon the scan rate.

Yet another object of the invention is to provide an apparatus which is substantially insensitive to amplitude and phase variation.

A still further object of this invention is to provide an apparatus wherein the diameter of the cursor coil is not critical.

A still further object of this invention is to provide an apparatus wherein some tilt of the cursor coil is permissible.

Another object of this invention is to provide an apparatus for obtaining absolute coordinate determination while permitting removal and replacement of the cursor from the grid tablet without re-initializing.

Still further objects of this invention are to:
provide a system without routine preventative maintenance requirement;
provide a small number of wires per inch;
provide a stable system without adjustments;
provide a system relatively more immune to temperature, humidity, noise, dielectric variations, magnetization and electrical noise;
provide a system with interchangeable subassemblies;
provide a system with lower parts count and assembly labor.
provide a system relatively immune to source (hard copy) material and thickness (except ferrous metals); and
provide means to energize the grid wires by sharing the multiplexing wires at different positions in the tablet to minimize the feed wires required.

BRIEF DESCRIPTION OF THE DRAWINGS

These and other objects of the invention will become apparent from the following description taken in conjunction with the drawings wherein.

DESCRIPTION OF PREFERRED EMBODIMENT

The basic principles of the invention can be broadly described in the context of a coordinate digitizing system in which a positioning cursor is moved over a surface with parallel wires for each axis with the axes being perpendicular to each other. The wires may be hand or machine layed, printed or etched on fiberglass printed circuit board, glass or other suitable stable substrate.

The main feature of this invention is that an electromagnetic field or wave front is generated by sequentially scanning or stepping down the grid in incremental steps, is made to appear to be traveling down the grid in incremental steps and is made to appear to be travelling down the grid at a uniformly controlled rate as it passes the cursor coil. Because this wave can be made to appear to be traveling at a highly uniform rate down the grid, a simple time measurement can be made to determine the position of the cursor over that grid.

This invention uses several well known principles to accomplish this task. They are (1) that when a coil is placed near a conductor conducting an AC signal, the closer the coil is to the conductor, the greater the energy transfer; (2) that when a conductor is excited first on one side of a coil in a given phase and then on the other side, the respective signals picked up by the coil will be 180° C. out of phase.

Figure 8:
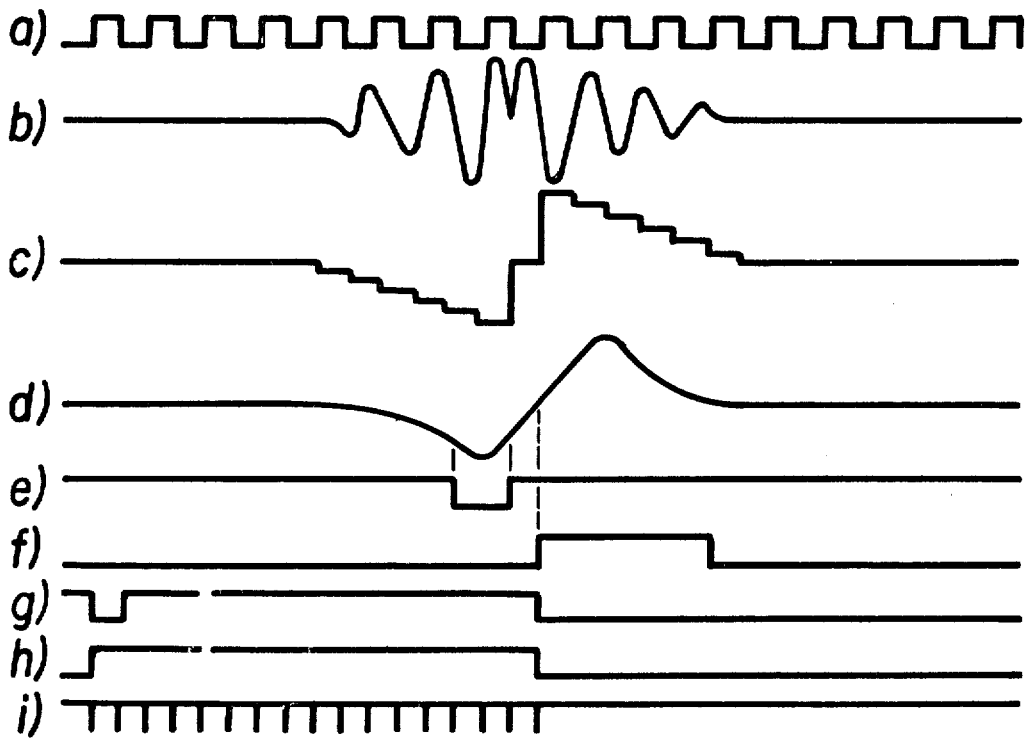
FIG. 8 are graphical representations of the signal outputs at various points in the system of FIG. 5.

A less obvious principle involves detecting or interpolating a reference level signal of "STOP" signal, which is linearly related to time, from the cursor coil signal envelope when a timed or controlled wave, generated by successively activating grid lines, is made to pass from one end to the other end of a grid network and, therefore, from one side to the other side of the cursor coil. In this invention, this is accomplished in a unique and linear fashion by detecting the null (see FIG. 8B) in the envelope of the cursor signal each time the grid is scanned. Many conventional methods could be utilized to detect the null in the cursor envelope signal. The current embodiment employs a filter which responds uniquely to the complex cursor waveform to predict or interpolate the cursor coil electrical center with a resolution, accuracy and stability not obtainable with other techniques using comparable wire spacing and component parts count, and without adjustments.

Figure 1:
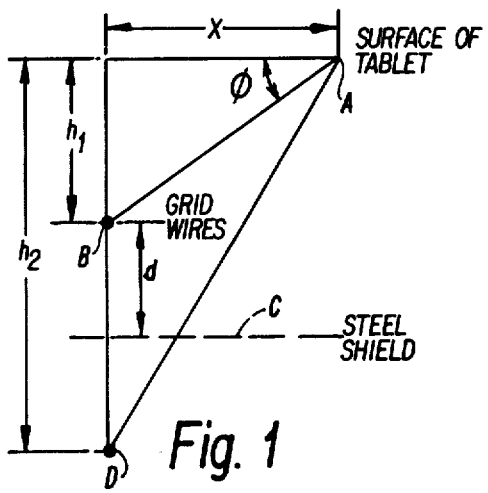
FIGS. 1 and 2 are diagrams which clarify the mathematics used to derive a representation of the complex cursor signal.

To determine the electrical makeup of this filter, the complex cursor waveform was defined mathematically as follows:

Referring to FIG. 1, the pickup coil (cursor) is taken at a height $h_1$ above the successively excited parallel grid wires. As is described later, there is a steel shield C a distance d below these wires. The resulting magnetic field is the same as that produced by a wire B at a distance $h_1$ below the coil and another wire D with opposite current at a distance $h_2 = h_1 + 2d$ from the pickup coil.

The flux passing through the coil was calculated by considering an arbitrary point A on the pickup plane (tablet surface). Again, referring to FIG. 1, the distance to the wire along the horizontal plane is denoted by x. The distance between wire B and arbitrary point A is $r_1$. Therefore, the normal component of flux contributed by wire B is given by:

$$\frac{1}{r_1} \cos \phi = \frac{x}{x^2 + h_1^2}. \quad \text{(eq 1)}$$

Because of the shield, the total component is $$x/(x^2 + h_1^2) - x/(x^2 + h_2^2) = U \quad \text{(eq 2)}$$

Figure 2:
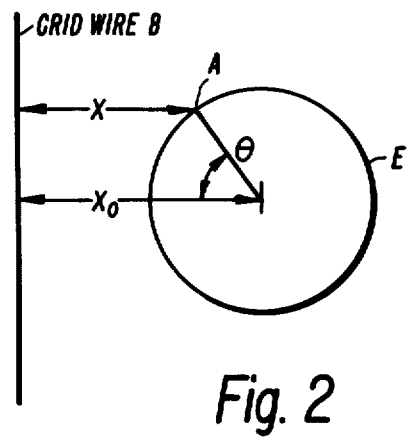

To determine the total flux linking the coil, the integral of U over the area of the circle bounding the coil is computed. As seen in FIG. 2, $X_0$ denotes the horizontal distance of the center of the coil E to the grid wire B. A scale factor is taken so that the radius of the coil is 1.

In the plane of the coil, y denotes the axis parallel to the grid wires. Integrating once in the x direction, the total flux U is $$U = \frac{1}{2} \int_{-1}^{+1} \log \left[ \frac{(x_0 - x)^2 + h_1^2}{(x_0 + x)^2 + h_1^2} \times \frac{(x_0 + x)^2 + h_2^2}{(x_0 - x)^2 + h_2^2} \right] dy \quad \text{(eq 3)}$$

where $$x^2 + y^2 = 1$$

Substituting $y = \cos \theta$ and $x = \sin \theta$, $dy = -\sin \theta d\theta$
The total flux U is given by $$2U = - \int_0^\pi \left( \log \left[ \frac{(\sin \theta - x)^2 + h_1^2}{(\sin \theta + x)^2 + h_1^2} \times \right. \right. \quad \text{(eq 4)}$$

-continued $$\left. \left. \frac{(\sin \theta + x)^2 + h_2^2}{(\sin \theta - x)^2 + h_2^2} \right] \right) \sin \theta d\theta$$

Having defined the complex cursor waveform, a filter function f(t), which is practical and accurate, was chosen to operate on U(x) such that the resultant zeros produce a highly accurate and linear output as a function of time and distance.

The output of the system is defined as $$H(x,t) = \int_0^n U(x-k) f(t-k) \quad \text{(eq 5)}$$

The zeros of H were calculated, using a computer, with various sample functions for f(t). Extremely accurate and linear results were achieved using $$f(t) = e^{-0.5T} \sin^4(0.5t), t > 0 \quad \text{(eq 6)}$$

$$f(t) = 0 \quad t \leq 0 \quad \text{(eq 7)}$$

Using many sample points, and using a least squares linear fit to evaluate the deviation, a theoretical system error of 0.0014" was achieved.

Figure 3:
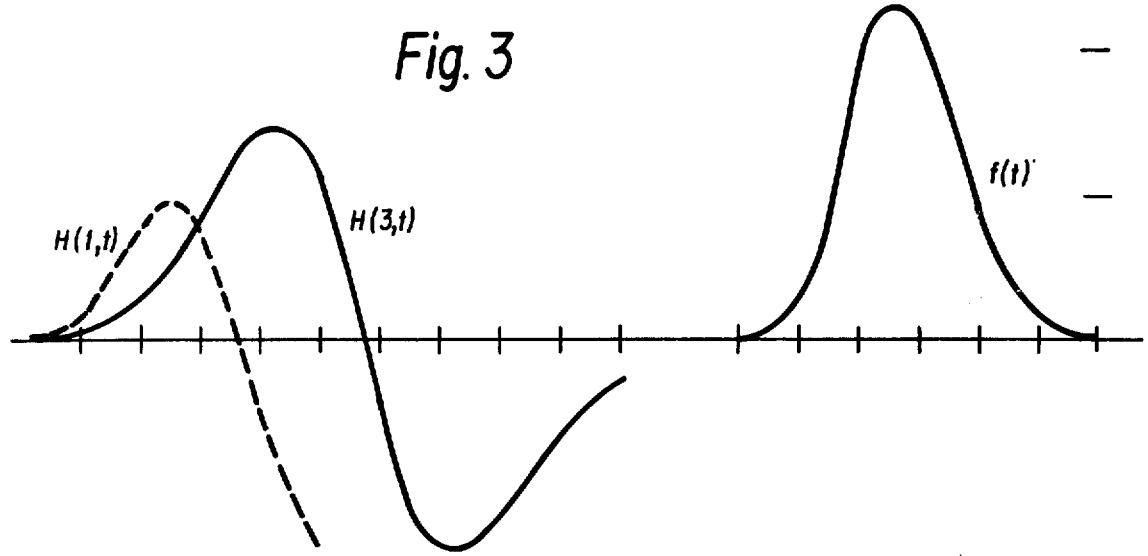
FIG. 3 is a graph of the functions $H(x,t)$ and $f(t)$ derived in the cursor signal analysis.

FIG. 3 shows plots of H(1,t), H(3,t), and f(t).

As can be seen in FIG. 3, the amplitudes of the maximums of H(x,t) are different but the zeros of H(x,t) are exactly two divisions apart on the time axis in the example.

Figure 4:
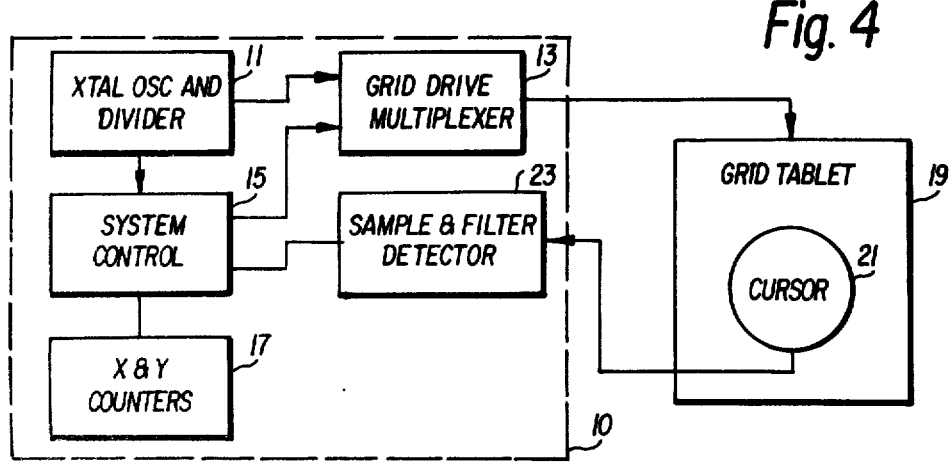
FIG. 4 is a block diagram of the basic components of the present invention.

Sample and filter detector 23, shown in FIG. 4, was synthesized from the mathematical filter function $f(t) = e^{-0.5t} \sin^4(0.5t)$.

The electrical implementation of f(t) is extremely simple from a component count and assembly point of view and utilizes only inexpensive, commercially available devices.

Detection of the cursor coil position by the above means provides a level of performance not obtainable through instantaneous or peak amplitude, or phase measuring techniques using the same number of grid wires and components. As shown by the above equations, the detection scheme is mathematically predictable and shows that an exceptionally high level of performance is obtainable. The filter characteristics are therefore unique and are critically related to the generated cursor coil signal.

Other variations of stimulating the grid wires should be utilized to obtain similar results providing that the predicting or interpolating filtering circuit is altered to provide an output which accurately and linearly relates the distance of the electrical center of phase reversal point of the cursor from a reference to time.

This circuit then operates on the complex cursor signal, which is induced in the cursor coil from the sequential actuation of grid lines by passing current through them, to afford a means of measuring cursor position relative to an arbitrary reference point by relating distance to time in an accurate linear fashion. The current system enables a precision clock to counters when the electromagnetic wavefront passes the arbitrary reference point and inhibits the precision clock when the detection circuitry discussed above detects a phase reversal in the complex cursor signal. The contents of the counter then contain a count which is precisely related to cursor position. An X-Y scanning system is used to thoroughly define the cursor position, that is, the horizontal position of the cursor is initially determined by scanning the X axis and then the vertical position is determined similarly by scanning the Y axis. Adding to the efficiency of the system is the fact that X axis and Y axis detection and counting circuitry can be common, thereby further reducing assembly and parts costs.

The invention will be explained by first describing the schematic illustrations of a preferred embodiment thereof with a subsequent description of the operating characteristics and signal outputs within the system.

Referring to the block diagram of FIG. 4, a precision crystal oscillator and divider 11 provides the basic system clock and subdivisions thereof required by the digitizing system. Connections are made to grid drive multiplexer 13 and system control circuits 15. Grid drive multiplexer 13 utilizes subdivisions of the basic system clock and inputs from system control 13 to sequentially energize the X and then the Y grid lines of the grid tablet 19. Grid drive multiplexer 13 is unique in that it minimizes the number of interconnections between grid tablet 19 and controller digitizing system 10, and eliminates the need for active components in grid tablet 9 which is very advantageous from a maintenance and assembly point of view. Grid drive multiplexer 13 thus establishes the electromagnetic field which induces an electrical signal in the cursor 21. The cursor inputs this signal to sample and filter detector 23, where it is processed to provide an input to system control 15 which relates the cursor position to time in a precise, linear fashion. System control 15 oversees system operation and provides gated clock inputs to the X+Y counter 17 where these gated clock pulses are accumulated in counters to precisely represent the physical position of the cursor on the grid tablet.

Figure 5:
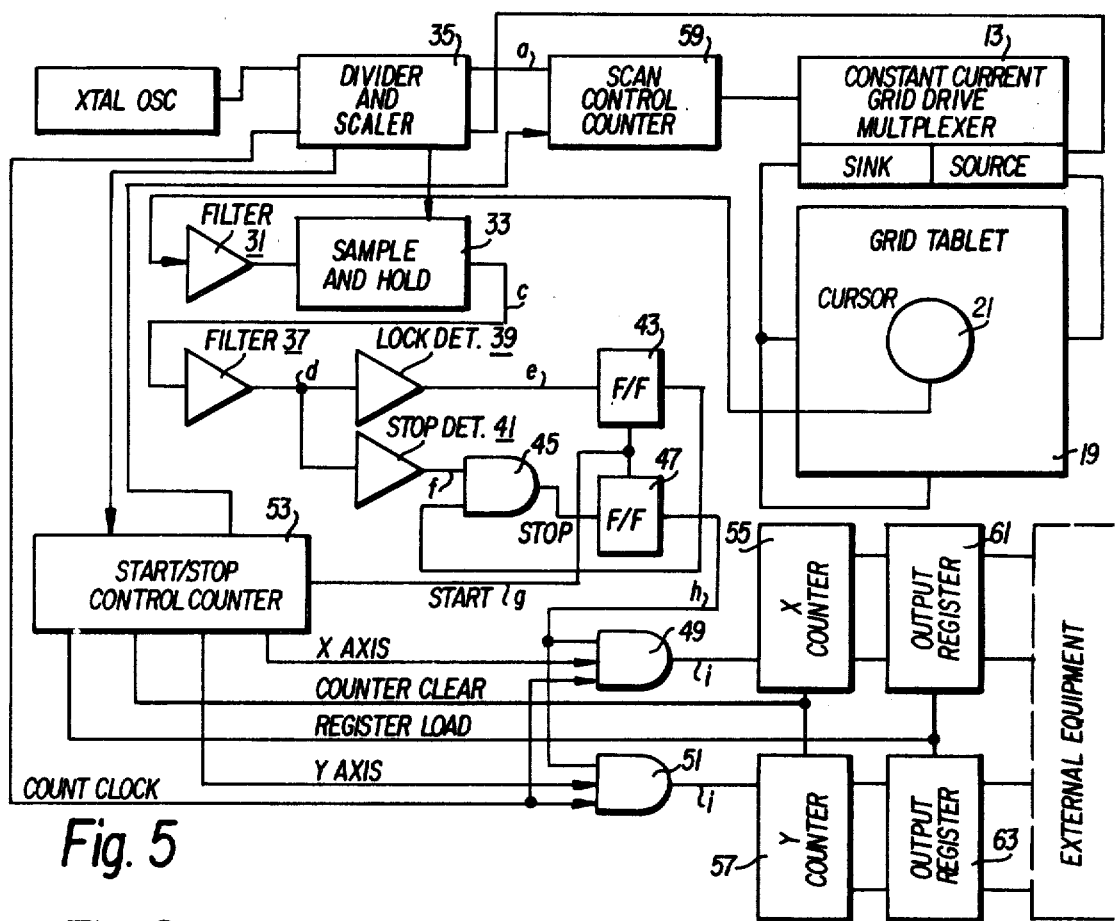
FIG. 5 is a schematic diagram of a preferred embodiment of the present invention.

FIG. 5 is a schematic diagram of a preferred embodiment of the present invention. The input to the system in provided by a crystal oscillator 11 having a fixed frequency. The output of the oscillator is coupled to a frequency divider and scaler 35 whose division parameters determine both the rate of scan and the system resolution.

A first output from divider 35 is supplied to the scan control counter 59. Scan control counter 59 also receives inputs from the start/stop/control counter 53. Under control from these inputs, the scan control counter 59 provides inputs to the constant current grid drive multiplexer 13 to enable current to one grid line at a time in the proper order (sequentially left to right-X axis, followed sequentially bottom to top-Y axis).

A further output from the divider is coupled to the constant current grid drive multiplexer 13. This input enables a constant current source in the constant current grid drive multiplexer 13 which passes a controlled, fixed current to the selected grid wire.

Constant current grid drive multiplexer 13 provides outputs to grid tablet 19 to generate the moving electromagnetic field which is sensed by cursor 21 as the complex cursor waveform which was previously discussed. Constant current grid drive multiplexer 13 is critical to this invention in that it eliminates the need for active switching elements in grid tablet 19 by minimizing the number of interconnections required to control a large number of grid lines. This circuitry is shown in more detail in FIG. 6. As can be seen, the circuit is divided into sink and source elements. A sink element provides a ground to one group of grid lines while the source element provides a constant current signal to one grid line at a time. Other grid lines are connected to the activated source line but no current flows in these grid lines since the sink elements at the other end of those grid lines are inactive.

Cursor 21 inputs the complex cursor waveform to filter 31, which is one stage of the synthesized circuit which represents the mathematical model required for optimum interpolation of the cursor signal, as discussed previously. The output of filter 31 is coupled to a sample and hold circuit 33. The output of filter 31 is sampled under control of another output from the divider and scaler circuit 35, thus synchronizing the sample to the grid scan. The sampled signals are held capacitively and input to filter 37 which completes the synthesized circuit representing the previously discussed mathematical model required to linearly relate cursor position to time.

The output of filter 37 is coupled to two level detectors, lock detect 39 and stop detect 41. The output of filter 37 is a voltage envelope approximating one sinusoidal cycle, as will be discussed later in conjunction with FIG. 8. Lock detector 39 detects an arbitrary voltage level on this envelope which indicates that the cursor is coupled electrically to the grid tablet sufficiently to provide accurate results. The output of lock detector 39 clocks F/F 43 to remove the inhibit signal from gate 45.

The disclosed embodiment of this invention detects a transition across 0 volts to activate stop detector 41. Therefore, the first transition across OV of the output of filter 37, following the removal of the inhibit output of F/F 43 will pass through gate 45 as a STOP signal to clock F/F 47 thereby removing the count window enable from count gates 49 and 51.

Count gates 49 and 51 also have inputs from divider and scaler 35. These inputs are a high frequency clock (count clock) which are passed through count gate 49 or 51 to become the X COUNT or Y COUNT signals. The frequency of count clock relative to the grid scan rate determines the resolution of the system.

Count gates 49 and 51 also receive inputs (X Axis and Y Axis) from the start/stop/control counter 53. These signals indicate which axis is being scanned and, along with the count window signal (discussed below) enable the count clock through the proper count gate 49 or 51 to the X counter 55 or the Y counter 57.

Start/stop/control counter 53 receives an input from divider and scaler 35 which is a clock signal with a frequency of two times the basic grid scan rate. Counter 53 generates a START signal which sets F/F 47 to enable the COUNT WINDOW signal h and clears F/F 43. This signal, START, indicates the arbitrary reference point discussed previously from which time is measured to the STOP signal to give an accurate representation of cursor position. The time from START to STOP is represented by the duration of the COUNT WINDOW signal.

Start/stop/control counter 53 also has an output to scan control counter 59 which synchronizes the grid scan to the remainder of the system circuitry.

Other outputs from start/stop/control counter 53 are the "counter clear" and "register load" signals. The counter clear signal clears X counter 55 and Y counter 57 following the completion of an X and Y scan and just prior to the start of a new X and Y scan. The register load signal loads the contents of X counter 55 and Y counter 57 into X and Y output registers 61 and 63 following a complete X and Y scan but prior to the counter clear signal.

X counter 55 and Y counter 57 receive the X count and Y count signals, respectively, as inputs. The contents of these counters, at the time the register load signal occurs, represents the position of the cursor on the grid tablet relative to an arbitrary reference point. X counter 55 and Y counter 57 have outputs to X output register 61 and Y output register respectively. These outputs are stored in the registers when the register load signal from counter 53 goes active. The outputs of these registers are available to external interface equipment such as computers, terminals, etc., for further processing or storage.

It should be noted that X counter 55 and Y counter 57 can be combined into a single counter, to further optimize the circuitry, with the outputs multiplexed to an external device. Also, the system could have the X count and Y count signals as outputs to eliminate the need for counters and registers in this invention. In this case, the external interface equipment would provide the counting circuitry required to determine cursor position.

Figure 7:
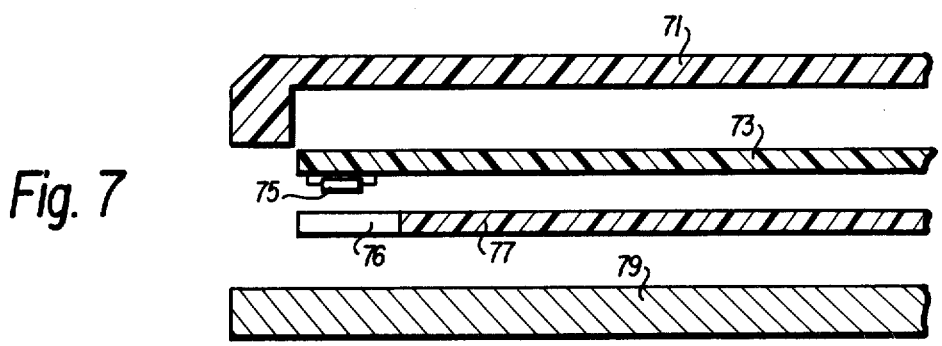
FIG. 7 is an exploded sectional view of the grid broad.

FIG. 7 is a cross-sectional view of a preferred digitizing table. As can be seen, the construction is very simple, consisting of only four parts, thus minimizing both material and labor costs. Reliability of the digitizing table is excellent since there are no active electronic components in the table.

Figure 6:
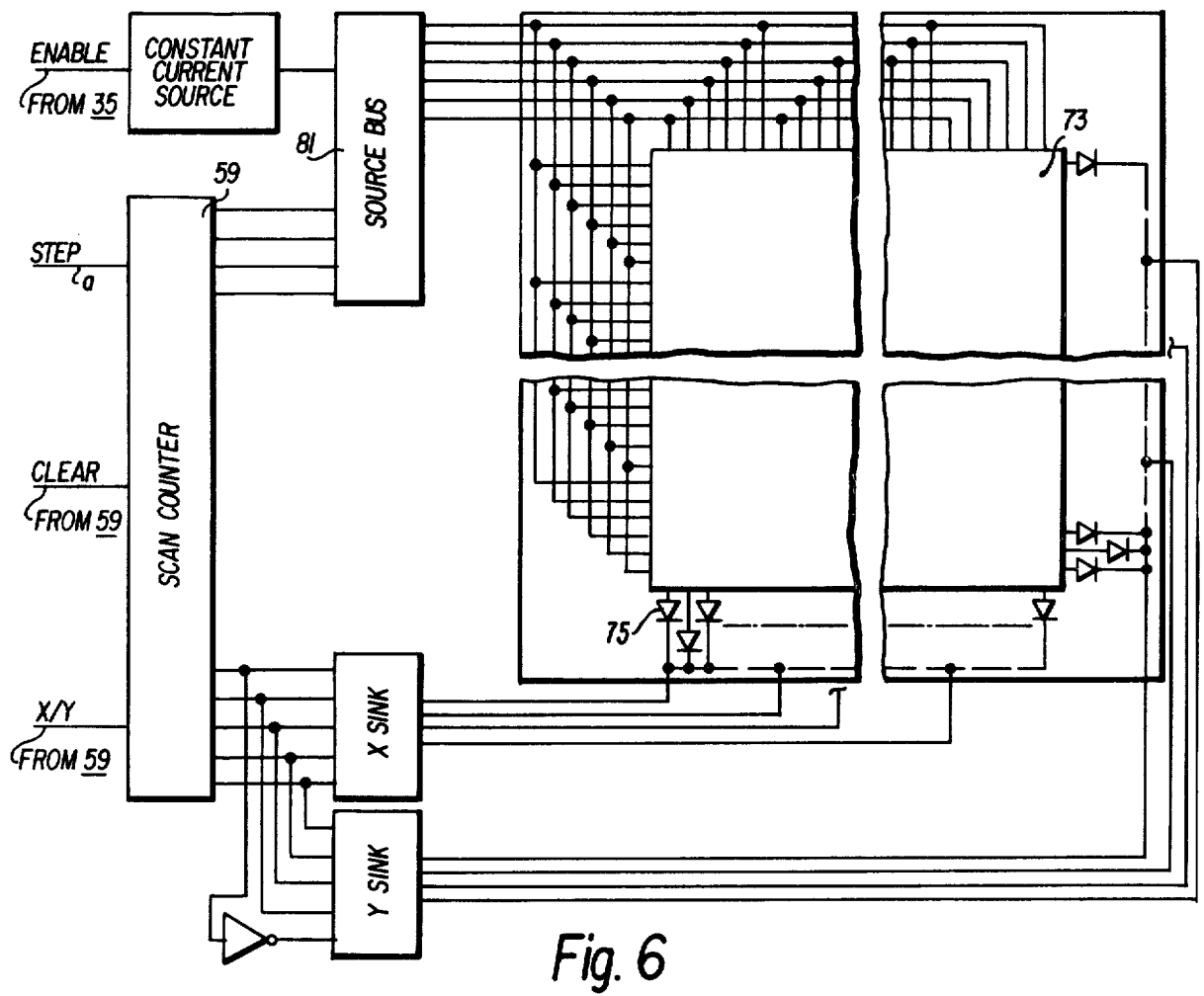
FIG. 6 is a schematic diagram of the constant current grid drive multiplexer and grid tablet.

The digitizing table is enclosed by a protective top cover 71 which has a smooth top surface made of durable, abrasion resistant material. The present embodiment of this invention utilizes a printed circuit board 73, with conductors forming an XY grid array (shown schematically in FIG. 6) with parallel X conductors on the top surface of the board and parallel Y conductors on the bottom surface of the board, to generate the moving electromagnetic field discussed previously. The printed circuit board also routes individual grid lines to the anodes of diodes 75, or to source bus 81 as shown in FIG. 6. Source bus 81 and the cathodes of diodes 75 are then routed to a card edge connector (not shown) for connection via a cable to the constant current grid drive multiplexer electronics. Other techniques for manufacturing the XY grid network would work equally well. Among these are hand or machine strung insulated wires bonded to virtually any nonferrous substrate, etch and fill, and deposition. A nonconductive spacer 77 (FIG. 7) serves two purposes. It insulates the Y grid conductors on grid board 73 from shield 79 and it establishes the distance d between the shield and the grid wires as shown in FIG. 1 and discussed previously in conjunction with the derivation of the mathematical model of the electromagnetic field generated by the grid array. A cutout on one edge 76 of spacer 77 is cut so as to provide space for sink diodes 75. Shield 79 serves as a protective bottom cover for the digitizing tables. More importantly, it is an integral component in the generation of the electromagnetic field. As can be seen in equations 2, 3 and 4, the shield serves as a non-linear attenuator to the generated electromagnetic field. It virtually cancels the field generated by wires not in close proximity to the cursor pickup coil. This is beneficial in that it minimizes unwanted edge effects caused by the discontinuity of the XY grid network at the edges of the table and by the fields generated by the routing conductors from the edge connector. Also, it modifies the generated field such that the complex cursor signal is more readily linearized (distance to time) between the discrete grid lines. The shield additionally minimizes the effect of unwanted externally generated electronic noise. Finally, it adds rigidity to the structure. The current embodiment of this invention utilizes cold rolled steel as a shielding material.

The digitizing table has been made translucent for back lighting application. This is accomplished by utilizing a clear or translucent material for protective top cover 71 and spacer 77. Good results are achieved using standard PC board material for the printed circuit board 73. However, best light transmission results from an XY grid network of conductors bonded to a clear glass or plastic substrate. A perforated shield may be utilized to allow for light transmission while still retaining the beneficial effects of the solid shield discussed previously.

A transparent tablet, for rear projection applications, has been realized by manufacturing a precisely registered 2 layer XY grid network with grid currents flowing in opposite directions in each plane as suggested by the mathematical model. This technique eliminates the need for a shield, but is more costly to manufacture and is more susceptible to externally generated electrical noise.

FIGS. 8(a) through (i) show outputs of the system at various points as identified in FIG. 5.

The input to the scan control counter 59 from divider and scaler 35 is the scan clock and is shown in FIG. 8(a). It is a constant clock which drives scan control counter 59 to enable current to one grid line at a time in the proper sequence through the constant current grid drive multiplexer 13.

FIG. 8(b) is the complex cursor waveform after it has been filtered and amplified by filter 31. As can be seen, when cursor wave form is present, there is one cycle in the cursor waveform for each cycle of the clock 8(a). Also, a 180° phase reversal is shown. This occurs as the moving electromagnetic field passes the exact electrical center of the cursor coil.

FIG. 8(c) is a step function which represents the output of sample and hold circuit 33. This signal is input to filter 37. The output of filter 37 is shown in FIG. 8(d). This signal corresponds to the function H (x,t), discussed previously and shown in FIG. 3, the zero crossing of which linearly relates cursor position to time.

The output of lock detector 39 is shown in 8(e). This circuit is a level detector which monitors the negative transition of the output of filter 37. When signal 8(e) is not present, it indicates that the cursor coil is not sufficiently electrically coupled to the grid tablet to provide accurate results.

FIG. 8(f) is the output of stop detector 41. The first positive transition of this signal following the lock detect signal, 8(e) clocks F/F 47 to remove the count window signal, FIG. 8(h). This positive transition indicates the zero of the function H (x,t) shown in FIG. 3. F/F 43 is set by the start pulse, FIG. 8(g) which indicates the arbitrary reference point from which time is measured to the stop signal to represent cursor position. The count window signal FIG. 8(h) is a signal which is true for the duration of this period, from start pulse to stop pulse. It is used to gate the high frequency count clock through count gates 49 and 51. FIG. 8(i) is the gated count signal at the output of either count gate 49 or 51. It should be noted that the frequency of the count clock relative to the scan clock, FIG. 8(a) determines the system resolution. By varying this ratio, virtually any scale or resolution is possible.

It is to be understood that the above description and drawings are illustrative only since equivalent components could be substituted in many instances without departing from the invention. Accordingly, the invention is to be limited only by the scope of the following claims.

We claim:

1. Apparatus for determining the position of a selected point on a grid having a plurality of X and Y grid lines comprising
   clock means;
   constant current grid drive multiplexer means coupled between said clock means and said grid lines;
   scan control means coupled between said clock means and said constant current grid drive multiplexer means for controlling the energization of said grid lines by said constant current grid drive multiplexer means;
   cursor means including a coil moveable on said grid;
   sample and filter detector means coupled between said cursor and said control means for relating cursor position to time in a linear mode, the parameters of said sample and filter detector means being determined as a function of the field formula of the electromagnetic field generated by said X and Y grid lines;
   X and Y counter means; and
   means for coupling said X and Y counter means to said control means and said clock means whereby gated clock pulses are accumulated in said counters to measure the position of said cursor on said grid.

2. The apparatus of claim 1 wherein said clock means comprises
   a crystal oscillator; and
   a frequency divider and scaler coupled to the output of said oscillator.

3. The apparatus of claim 1 further comprising
   scan control counter means coupled between said clock means, said control means and said constant current grid drive multiplexer drive means for sequentially controlling the energization of said grid lines.

4. The apparatus of claim 1 wherein said constant current grid drive multiplexer means comprises
   a constant current source;
   sink elements for providing a ground to one group of grid lines at a time; and
   source elements for providing a constant current signal from said constant current source to one grid line at a time within said grounded group of grid lines.

5. The apparatus of claim 1 wherein said sample and filter detector means comprises
   a sample and hold circuit;
   a first filter coupled between said cursor means and said sample and hold circuit;
   a lock detector;
   a stop detector;
   a second filter coupled between the output of said sample and hold circuit and said lock detector and said stop detector, said first and second filters providing a voltage envelope to said detectors which linearly relates cursor position to time; and
   gates for coupling said lock and stop detectors to said X and Y counters.

6. The apparatus of claim 1 further comprising
   an electrically passive digitizing table for use with said cursor comprising
   a non-conductive substantially flat plate for supporting said X and Y grid lines;
   a translucent cover for said flat plate having a substantially smooth top surface;
   a conductive shield bottom cover; and
   a non-conductive spacer between said flat plate and said shield.

7. The apparatus of claim 6 wherein said shield is perforated for light passage.

8. An electrically passive digitizing table for use with a cursor comprising
   a non-conductive substantially flat plate;
   X grid lines on one side of said plate;
   Y grid lines on the other side of said plate;
   a translucent cover for said flat plate having a substantially smooth top surface;
   a conductive shield bottom cover; and
   a non-conductive spacer between said flat plate and said shield.

9. The table of claim 8 wherein said shield is perforated for light passage.

* * * * *